United States Patent [19]

Wu

[11] Patent Number: 5,783,898
[45] Date of Patent: Jul. 21, 1998

[54] PIEZOELECTRIC SHUNTS FOR SIMULTANEOUS VIBRATION REDUCTION AND DAMPING OF MULTIPLE VIBRATION MODES

[75] Inventor: Shu-Yau Wu, Artesia, Calif.

[73] Assignee: McDonnell Douglas Corporation, Huntington Beach, Calif.

[21] Appl. No.: 606,579

[22] Filed: Feb. 26, 1996

[51] Int. Cl.$^6$ .................. H01L 41/10; H02H 1/04
[52] U.S. Cl. ......................... 310/316; 310/317
[58] Field of Search ......................... 310/316, 317

[56] References Cited

U.S. PATENT DOCUMENTS

| | | | |
|---|---|---|---|
| 3,881,137 | 4/1975 | Thanawala | 317/53 |
| 4,122,725 | 10/1978 | Thompson | 310/326 |
| 4,987,564 | 1/1991 | Yokoyama | 367/140 |
| 5,262,677 | 11/1993 | Ramirez | 307/105 |
| 5,337,090 | 8/1994 | Ogino et al. | 348/626 |

FOREIGN PATENT DOCUMENTS

| | | | |
|---|---|---|---|
| 1525998 | 4/1968 | France | 310/317 |
| 394113 | 8/1973 | U.S.S.R. | 310/316 |

*Primary Examiner*—Thomas M. Dougherty
*Attorney, Agent, or Firm*—Bell Seltzer Intellectual Property Group of Alston & Bird LLP

[57] ABSTRACT

A mechanical vibration control device includes a piezoelectric material having a pair of electrical leads extending therefrom, and a shunt circuit connected across the electrical leads of the piezoelectric material. The shunt circuit includes an energy dissipation circuit element having a dissipation element resistor, and a frequency tuning element inductor connected in parallel with the dissipation element resistor. To reduce and damp multiple vibrational modes, multiple shunt circuits are added in parallel. The various shunt circuits are isolated from each other with an isolator circuit element connected in series with each energy dissipation circuit element. The isolator circuit element includes an isolator element capacitor, and an isolator element inductor connected in parallel with the isolator element capacitor.

12 Claims, 3 Drawing Sheets

PIEZOELECTRIC SHUNTS FOR SIMULTANEOUS VIBRATION REDUCTION AND DAMPING OF MULTIPLE VIBRATION MODES

BACKGROUND OF THE INVENTION

This invention relates to the amplitude reduction and damping of vibration in structures, and, more particularly, to a passive piezoelectric vibration suppression and damping device and approach.

Structures such as used in aircraft and spacecraft experience vibration during service. The vibration is undesirable because it is uncomfortable for occupants or can lead to control problems or damage to sensitive instruments in the vehicle. The vibration is also undesirable because it leads to fatigue damage of the structure itself. Care is taken in the design of the structure to minimize such vibration, but some vibration is present regardless of the care taken in design.

A number of techniques have been developed to reduce the amplitude and achieve damping of the structural vibration. In one, energy-absorbing materials such as elastomers are built into the structure or into joints of the structure. These energy-absorbing materials reduce the amplitude of the vibration without damage to the materials.

In another approach, piezoelectric materials are used to convert mechanical vibrational energy into electrical energy, and the electrical energy is thereafter dissipated. A piezoelectric material is one that converts electrical energy into mechanical movement, or, conversely, converts mechanical movement such as vibration into an electrical voltage. A "patch" of the piezoelectric material is fixed to the surface of the structure which vibrates during service, so that vibrational energy in the structure is transferred into the piezoelectric material. Voltage leads from the piezoelectric material are connected to external electrical circuitry, where either a counter voltage is generated (an "active" vibration control technique) or the energy in the voltage produced by the piezoelectric material is dissipated (a "passive" vibration control technique). The active vibration control technique requires that the counter voltage be generated and fed back to the structure, and therefore requires more complex circuitry than the passive vibration control approach. The present invention deals with the passive vibration control technique, an approach termed "piezoelectric shunting".

Passive piezoelectric shunting has been known for some time, but the existing techniques have drawbacks in their application. The efficiency of the external electrical circuitry can be improved. The available piezoelectric shunting methodology is also difficult to apply to reduce and to damp a number of different vibrational modes, which are usually present in complex structures. There is therefore a need for an improved approach to passive piezoelectric shunting of structures. Such an approach would be useful for aerospace structures, but would also find applications in a wide variety of other areas such as the tuning of acoustic components and structures. The present invention fulfills this need, and further provides related advantages.

SUMMARY OF THE INVENTION

The present invention provides a mechanical vibration control device and a method for its use to reduce vibrational amplitudes in structures. The device is fully passive and utilizes non-complex components. It may be used to reduce amplitude of and to damp one or multiple vibrational modes at a single location on the structure. The device is assembled from known elements.

In accordance with the invention, a mechanical vibration control device comprises a piezoelectric material having a pair of electrical leads extending therefrom, and a shunt circuit connected across the electrical leads of the piezoelectric material. The shunt circuit includes an energy dissipation circuit element comprising a dissipation element resistor, and a frequency tuning element inductor connected in parallel with the dissipation element resistor. The piezoelectric material is preferably fixed to a structural element as a patch, and the shunt circuit is located apart from (either adjacent to or remote from) the structural element.

The shunt circuit is expandable to include additional energy dissipation circuit elements, connected in parallel. The multiple energy dissipation circuit elements are tuned to dissipate energy of several vibrational modes at preselected frequencies. However, to ensure that the energy dissipation circuit elements do not interact in a manner so as to interfere with the energy dissipation of these modes at the preselected frequencies, each energy dissipation circuit element preferably has connected in series therewith an isolator circuit element. The isolator circuit element comprises an isolator element capacitor and an isolator element inductor connected in parallel with the isolator element capacitor.

Thus, in a preferred embodiment, a mechanical vibration control device comprises a piezoelectric material having a pair of electrical leads extending therefrom, a structural element to which the piezoelectric material is fixed, and at least one shunt circuit connected across the electrical leads of the piezoelectric material. Each shunt circuit includes an energy dissipation circuit element comprising a dissipation element resistor, and a frequency tuning element inductor connected in parallel with the dissipation element resistor. Each shunt circuit further includes an isolator circuit element connected in series with the energy dissipation circuit element. The isolator circuit element comprises an isolator element capacitor, and an isolator element inductor connected in parallel with the isolation element capacitor. Each shunt circuit is tuned to a preselected frequency to reduce vibration of a preselected mode. The modes are selected according to a separate determination of the vibrational modes to be suppressed. The approach to tuning will be discussed subsequently.

This technique allows multiple vibrational modes to be reduced and damped at a single patch location, an important advantage. Otherwise, it would be necessary to provide multiple piezoelectric patches at adjacent locations, which would be inefficient. Additionally, such an alternative technique would be somewhat ineffective, because the vibrational amplitudes vary spatially. Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

FIGS. 7(a-c) are graphs of the reduction and damping of two vibrational modes using the present approach, wherein

DETAILED DESCRIPTION OF THE INVENTION

Figure 1:
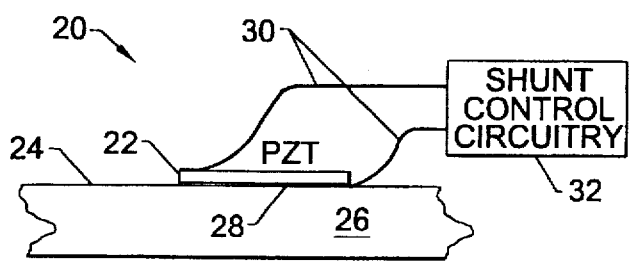
FIG. 1 is a schematic cross-sectional view of a mechanical vibration control device according to the invention.

FIG. 1 depicts a mechanical vibration control device 20. The vibration control device 20 includes a piece of a piezoelectric material 22. Numerous piezoelectric materials are known and are operable in the present invention. The preferred piezoelectric material 22 is a ceramic compound of lead zirconate titanate, abbreviated as PZT. The piece of piezoelectric material 22 is in the form of a thin sheet, typically having a thickness of about 0.010 to about 0.040 inches, and lateral dimensions of about ½ to about 1 inch, or larger as necessary, sometimes termed a "patch". These dimensions are presented by way of illustration and not limitation, and no limitations are known either for the piezoelectric material or its size.

The piece of piezoelectric material 22 is typically affixed to a surface 24 of a structural element 26 that is subject to vibration during service. The piece of piezoelectric material may be affixed by any operable technique, with a layer of adhesive 28 being preferred. The nature of the adhesive depends on the nature of the structural element, but for a structural material a preferred adhesive is an epoxy.

A pair of leads 30 is joined to the piece of piezoelectric material 22 at two oppositely disposed surfaces on which conductive electrodes are coated, preferably at the top and bottom major surfaces. The leads 30 extend to shunt control circuitry 32, positioned at a location apart from the piece of piezoelectric material (as pictured), either remote from or adjacent to the piece of piezoelectric material or even bonded to the same structural element 26. A number of different types of shunt control circuitry 32 can be used. FIGS. 2–6 illustrate five preferred forms, but other operable shunt circuits may be used as well.

Figure 2:
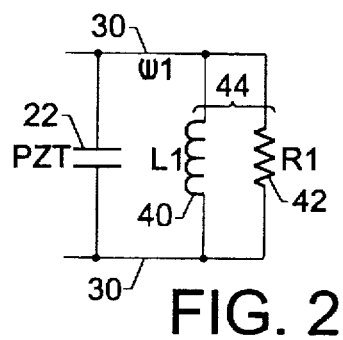
FIG. 2 is a circuit diagram showing a first form of the shunt circuit.

In one form of the shunt circuitry, shown in FIG. 2, a first frequency tuning element inductor 40 (having an inductance L1) and a first dissipation element resistor 42 (having a resistance R1), together comprising a first energy dissipation circuit element 44, are connected in parallel between the pair of leads 30. The piece of piezoelectric material 22 acts in the circuit with an effective capacitance $C_{eff}$, and is illustrated as a capacitor.

The numerical values of the first frequency tuning element inductor 40 and the first dissipation element resistor 42 are determined from the natural frequency $\omega$ of the mode of vibration that is to be reduced and damped. This vibrational mode is preselected as the frequency to be reduced and damped. The selection of this frequency is made from theoretical or experimental determinations of the vibrational modes found in the structural element 26. These determinations are not a part of the present invention, and a first value $\omega_1$ is taken as a provided value. Using this information, the values of L1 and R1 are $$L1 = 1/\omega_1^2 C_{eff}$$

and $$R1 = 1/(2^{1/2} K_1 \omega_1 C_{eff}).$$

$K_1$ is the generalized transverse electromechanical coupling coefficient of the patch at $\omega_1$. Selection of these values of L1 and R1 results in reduction and damping of a vibrational mode having a natural frequency of $\omega_1$.

Figure 3:
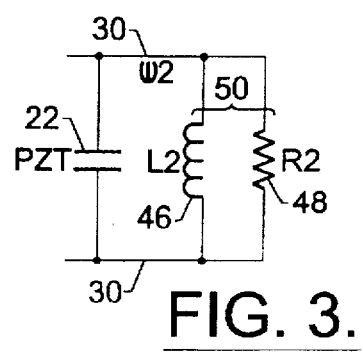
FIG. 3 is a circuit diagram showing a second form of the shunt circuit.

FIG. 3 shows the same circuit as in FIG. 2, except that it uses a second frequency tuning element inductor 46 (having an inductance L2) and a second dissipation element resistor 48 (having a resistance R2), forming a second energy dissipation circuit element 50. The numerical values of the inductor 46 and the resistor 48 are determined by the same approach as discussed for the circuit of FIG. 2, except that in this case the energy dissipation circuit element is tuned to reduce and damp a vibrational mode of the structural element 26 having a natural frequency of $\omega_2$. The values of L2 and R2 are given by $$L2 = 1/\omega_2^2 C_{eff}$$

and $$R2 = 1/(2^{1/2} K_2 \omega_2 C_{eff})$$

$K_2$ is the generalized transverse electromechanical coupling coefficient of the patch at $\omega_2$.

Figure 6:
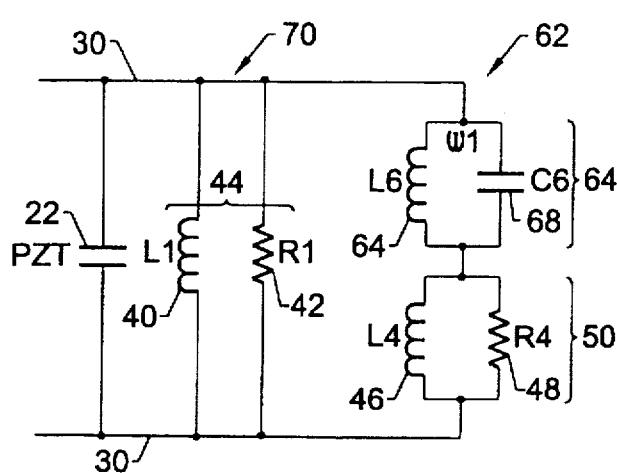
FIG. 6 is circuit diagram showing a fifth form of the shunt circuit.

The present arrangement of the frequency tuning element inductor and the dissipation element resistor in parallel in the energy dissipation circuit elements of FIGS. 2 and 3 is to be contrasted with the approach of placing an inductor and a resistor in series in a shunt circuit, as shown in FIG. 6 at page 254 of N. W. Hagood et al., "Damping of Structural Vibrations with Piezoelectric Materials and Passive Electrical Networks," *Journal of Sound and Vibration*, Vol. 146(2), pages 243–268 (1991). The present approach gives more accurate and more efficient damping performance, and is simpler to use, as compared with that of Hagood. In the Hagood approach, if the resistance is large, as where the piezoelectric material is well bonded to the structural element, iterative adjustments of the values of the circuit elements are necessary, which is a time consuming and tedious operation. In the present approach, on the other hand, the piezoelectric material, the resistor, and the inductor are all in parallel, permitting the independent determination of the values of the resistor and the inductor. The present approach is also more easily extended to simultaneous reduction and damping of multiple modes, as will be discussed subsequently.

It is often observed that two or more vibrational modes are present in a structural element at a single location. One approach to reduce and damp two modes would be to place a first piezoelectric patch and a second piezoelectric patch in a side-by-side arrangement on the surface of the structural element. The external circuitry for the first piezoelectric patch would be tuned to one of the natural frequencies, as in FIG. 2, and the external circuitry for the second piezoelectric patch would be tuned to the other of the natural frequencies, as in FIG. 3. This approach would have the drawback that there would have to be room to bond two (or more) piezoelectric patches to the surface of the structural element, and a large number of such piezoelectric patches would be required. Since the piezoelectric patches can be expensive, cost could become a consideration. The piezoelectric patches are also potentially heavy, adding to the total weight of the structure.

The alternative approach of the present invention is to provide shunt circuitry that is capable of reducing and damping two or more frequency modes with the use of a single piece of piezoelectric material 22. To accomplish this result, the first energy dissipation circuit element 44 and the second energy dissipation circuit element 50 are placed in parallel between the leads 30. However, without more, the two energy dissipation circuit elements 44 and 50 would interfere with each other in respect to their vibration reduction and damping performance.

Therefore, means is provided for isolating the first energy dissipation circuit element from the second energy dissipation circuit element to avoid tuning interference therebetween. In a preferred form, illustrated in FIG. 4, this means takes the form of a first isolator circuit element 54 positioned in series with the first energy dissipation circuit element 44. The isolator circuit element 54 comprises a first isolator element inductor 56 (having an inductance L5) and a first isolator element capacitor 58 (having a capacitance C5), arranged in parallel. The first energy dissipation circuit element 44 and the first isolator circuit element 54 together constitute a first shunt circuit 60. (Here, the first frequency tuning element inductor 40 is shown to have an inductance L3, and the first dissipation element resistor 42 is shown to have a resistance of R3. These numerical values may be different than those for the corresponding elements in FIG. 2 because of the addition to the first shunt circuit 60 of the first isolator circuit element 54.)

Figure 4:
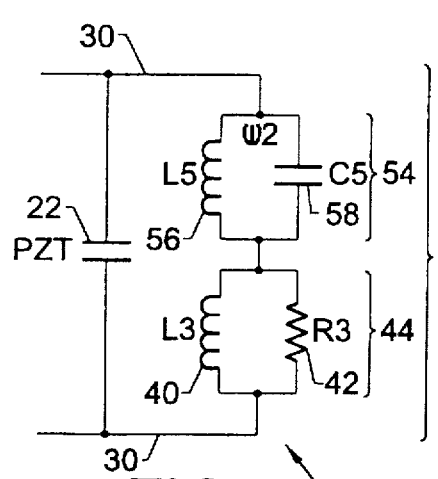
FIG. 4 is a circuit diagram showing a third form of the shunt circuit.
Figure 5:
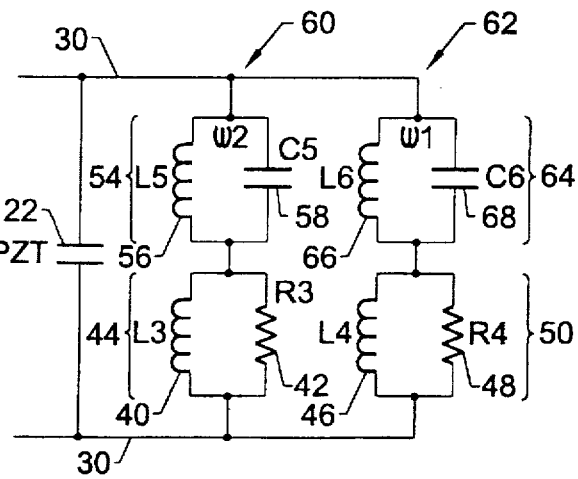
FIG. 5 is a circuit diagram showing a fourth form of the shunt circuit.

Although the isolator circuit element is shown as present in the single shunt-circuit system of FIG. 4, such an isolator circuit element will normally be present only when there are two or more such shunt circuits, as in FIG. 5. Here, the first shunt circuit 60 includes the first energy dissipation circuit element 44 and the first isolator element 54. Additionally, there is a second shunt circuit 62 which includes the second energy dissipation circuit element 50 and a second isolator element 64. The second energy dissipation circuit element 50 includes the second frequency tuning element inductor 46 (having an inductance of L4) and the second dissipation element resistor 48 (having a resistance of R4). The second isolator element 64 includes a second isolator element inductor 66 (having an inductance L6) and a second isolator element capacitor 68 (having a capacitance of C6).

In this circuit of FIG. 5, the values of the capacitances C5 and C6 and the values of the inductances L5 and L6 are selected such that the reactive impedance of the isolator circuit element in one of each shunt circuits is large, and nearly infinity, at the natural frequency of the other circuit element. That is, each shunt circuit is nearly open circuited at the natural frequency of the other. Consequently, the two shunt circuits connected in parallel across the piece of piezoelectric material 22 will not interfere with each other, but each will still serve to reduce vibrational energy at its respectively tuned natural frequency. When this principle is extended to more than two shunt circuits connected in parallel across the piece of piezoelectric material 22, each shunt circuit is treated as though it is in parallel with a circuit element comprising all of the other shunt circuits, and its values are determined accordingly.

For the case of two shunt circuits in parallel, as in FIG. 5, the first isolator circuit element 54 is tuned to anti-resonance at the natural frequency $\omega_2$ of the second shunt circuit 62, and the second isolator circuit element 64 is tuned to anti-resonance at the natural frequency $\omega_1$ of the first shunt circuit 60. The capacitances C5 and C6 are selected from available values, and the inductances L5 and L6 are determined as $$L5=1/\omega_2^2 C_5$$

$$L6=1/\omega_1^2 C_6$$

The inductances L3 and L4 are obtained by equating the total impedance of one of the shunt circuits (including both the energy dissipation circuit element and the isolator circuit element) at its natural frequency to the required value of the product of its natural frequency and its net inductance (e.g., $\omega_1 L1$ in the case of the first shunt circuit). The results are $$L3=L1-L5/(1-107_1^2 C5L5)$$

$$L4=L2-L6/(1-107_2^2 C6L6)$$

Various simplified shunt circuits may be selected when there is additional information known about the relation between the natural frequencies of the modes to be reduced and damped. For example, if $\omega_2$ is greater than $\omega_1$, a shunt circuit such as that shown in FIG. 6 may be utilized. This shunt circuit is similar to that of FIG. 5, except that only the second shunt circuit 62, having in series the second energy dissipation circuit element 50 and the second isolator circuit element 64, is used. A first shunt circuit 70 has only the first energy dissipation circuit element 44, and no first isolator element 54 is required. For this form of the shunt circuit, $$L4=[L1L2+L2L6-L1L6-\omega_2^2 L1L2L6C6]/[(L1-L2)(1-\omega_2^2 L6C6)].$$

Figure 7A:
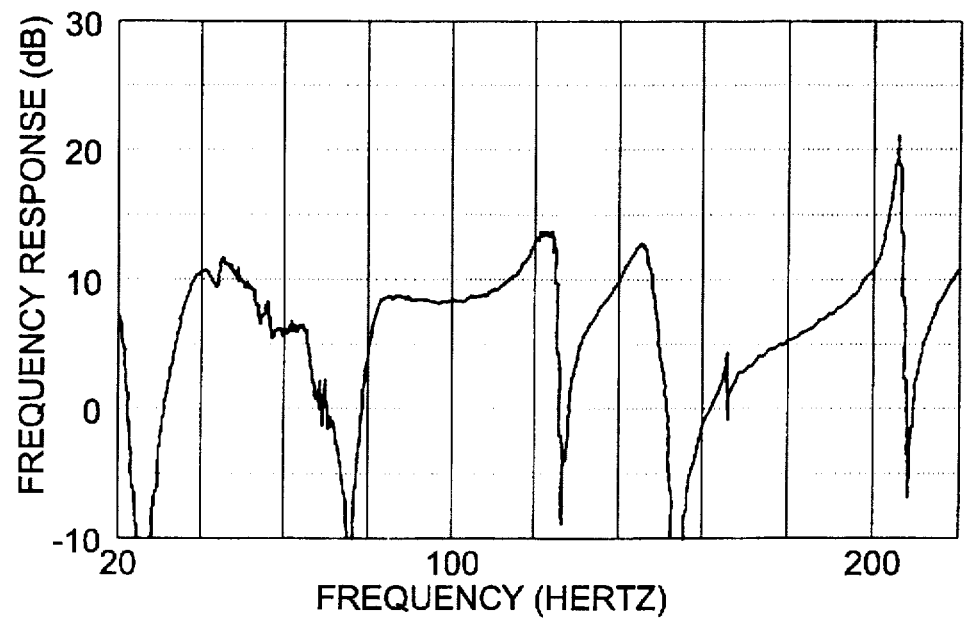
FIG. 7(a) illustrates the reduction and damping of a first vibrational mode.
Figure 7B:
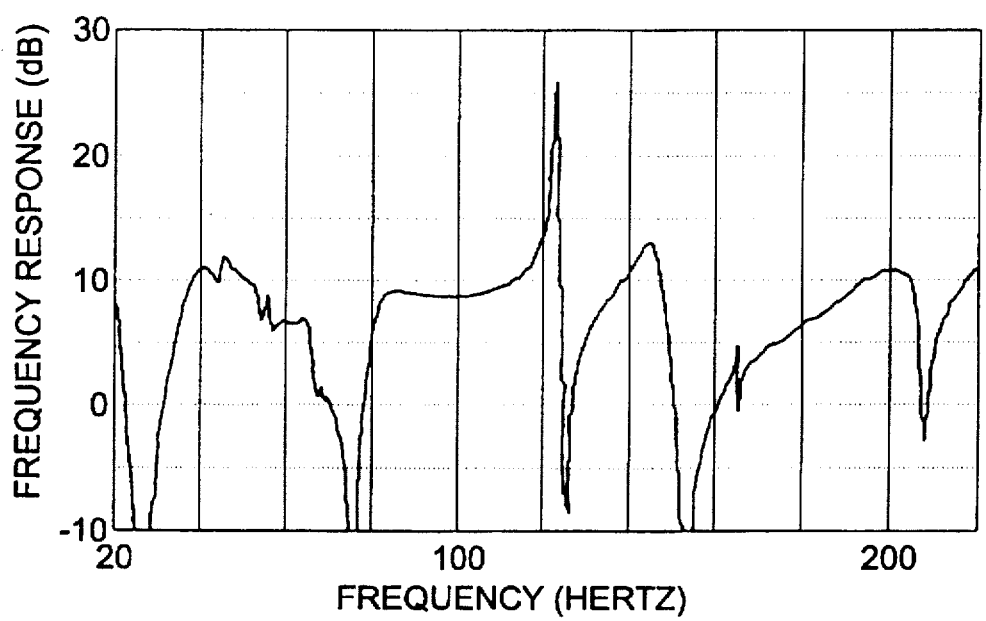
FIG. 7(b) illustrates the reduction and damping of a second vibrational mode.
Figure 7C:
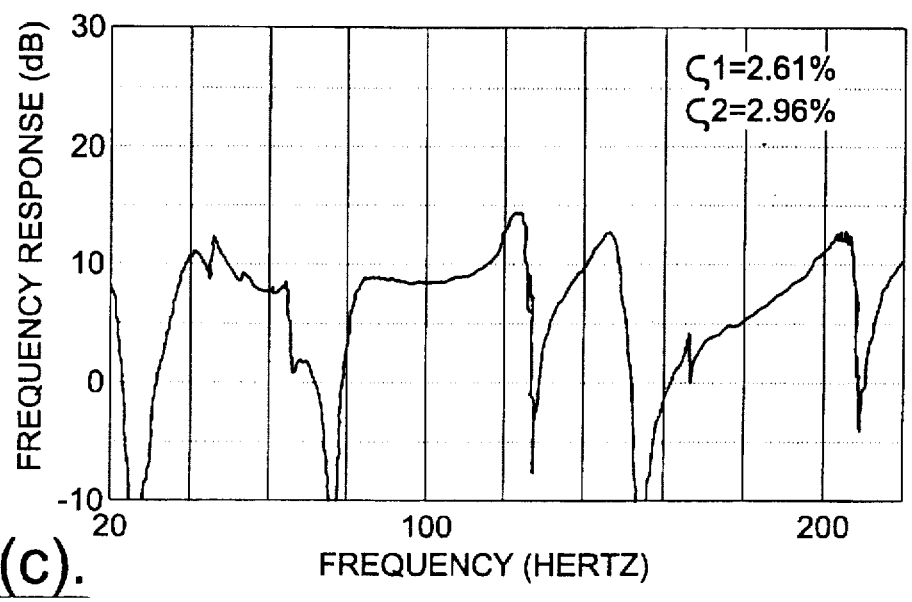
FIG. 7(c) illustrates the simultaneous reduction and damping of both the first and second vibrational modes.

The mechanical vibration control device 20 of FIG. 1 has been reduced to practice for the damping circuits shown in FIGS. 2, 3, and 6. The results are illustrated in FIGS. 7(a)–7(c), which are the frequency response curves of a mechanically excited beam structural element when reduced and damped by the three shunt circuits, respectively. When the arrangement of FIG. 1 is used with the shunt circuitry 32 of FIG. 2 tuned to reduce and damp a natural frequency $\omega_1$, by itself, the frequency response of FIG. 7(a) is obtained. The vibrational amplitude of acceleration at the first natural frequency $\omega_1$ (here a frequency of 122.6 Hz) is reduced by about 12 dB, while the vibrational amplitude at the second natural frequency $\omega_2$ (here a frequency of 204.8 Hz) is unchanged from the amplitude in the forced vibration. The critical damping factor is increased from 0.350 percent to 3.530 percent for the first mode after the shunting. Similarly, when the arrangement of FIG. 1 is used with the shunt circuitry 32 of FIG. 3 tuned to reduce and damp a natural frequency $\omega_2$, by itself, the frequency response of FIG. 7(b) is obtained. The vibrational amplitude at the second natural frequency $\omega_2$ is reduced by about 11 dB, while the vibrational amplitude at the first natural frequency $\omega_1$ is unchanged from the amplitude in the forced vibration. The critical damping factor is increased from 0.353 percent to 4.730 percent for the second mode after the shunting.

When the shunt circuit 32 used in the arrangement of FIG. 1 is that shown in FIG. 6, the frequency response is as shown in FIG. 7(c). The amplitudes of the vibrational modes at both the first natural frequency $\omega_1$ and the second natural frequency $\omega_2$ are each reduced by about 10 dB. The critical damping factors are increased to 2.61 percent and to 2.96 percent for the first and second modes, respectively, after the simultaneous damping of the two modes. That is, simultaneous amplitude reduction and damping of multiple vibration modes using a single patch of the piece of piezoelectric material 22 is successfully demonstrated, a surprising and unexpected result in view of the prior approaches.

Figure 8:
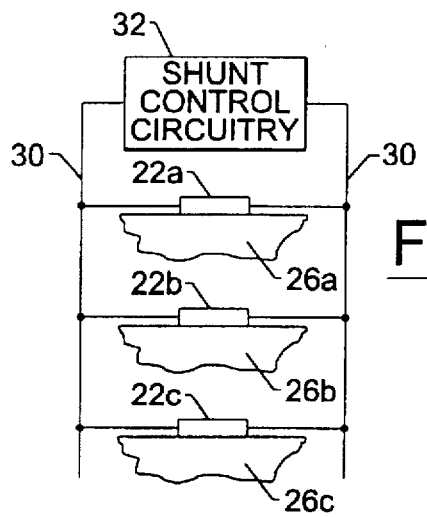
FIG. 8 is a circuit diagram showing the use of a single shunt circuit with multiple piezoelectric patches.
Figure 9:
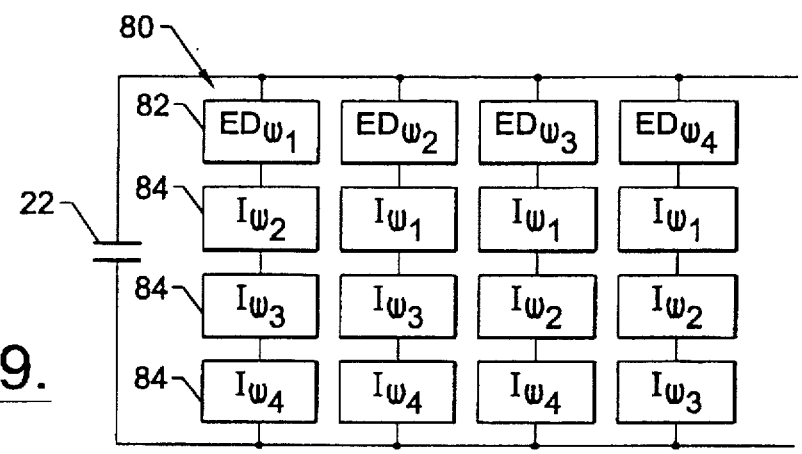
FIG. 9 is a circuit diagram showing a shunt circuit used for reducing and damping several vibrational modes simultaneously.

The approach of the invention can be extended to additional piezoelectric material patches, as shown in FIG. 8, and to damp additional frequencies, as shown in FIG. 9.

Referring to FIG. 8, the single shunt circuit 32 (provided with shunt circuitry for reducing and damping vibrational amplitudes at one, two, or more modes), is connected across a plurality of patches (here illustrated as three in number) 22a, 22b, and 22c of piezoelectric material, affixed to respective areas 26a, 26b, and 26c of the structural element (or more than one structural element). The values of the capacitances, resistances, and inductances are determined by a direct extension of the approach discussed previously, treating the multiple patches as being in parallel. The approach is readily extended to any number of patches.

To reduce and damp vibrational modes at a plurality of i frequencies, the shunt control circuit comprises a plurality i of energy dissipation circuit elements, each tuned for reducing and damping a respective frequency $\omega_i$, connected in parallel with the piezoelectric material patch 22. Isolator circuit elements 84 for each of the other frequencies are placed in series with each energy dissipation circuit elements 82. FIG. 9 shows this approach for the case of four frequencies to be reduced and damped, with four shunt circuit elements 80. Each shunt circuit element 80 has its respective energy dissipation circuit element 82 (indicated as ED$\omega_i$) and three isolator circuit elements 84 (indicated as I$\omega_j$, j≠i) in series therewith. Each of the energy dissipation circuit elements 82 preferably has the same structure as the energy dissipator circuit element 44 described previously, and each of the isolator circuit elements preferably has the same structure as the isolator circuit element 54 described previously. The values of the capacitances, resistances, and inductances in each case are determined by a direct extension of the approach discussed previously, treating the multiple shunt circuits as being in parallel. The approach is readily extended to any desired number of modes to be reduced and damped.

Although particular embodiments of the invention have been described in detail for purposes of illustration, various further modifications and enhancements may be made without departing from the spirit and scope of the invention. Accordingly, the invention is not to be limited except as by the appended claims.

I claim:

1. A mechanical vibration control device, comprising:
   a piezoelectric material for damping mechanical vibrations in a structure having at least two vibrational modes with natural frequencies of $w_1$ and $w_2$, said piezoelectric material having a pair of electrical leads extending therefrom;
   a first shunt circuit connected across the electrical leads of the piezoelectric material, the first shunt circuit having a natural frequency of $w_2$ such that the first shunt circuit damps vibrations having a natural frequency of $w_2$, the first shunt circuit including a first energy dissipation circuit element comprising
      a first dissipation element resistor, and
      a first frequency tuning element inductor connected in parallel with the dissipation element resistor and
   a first isolator circuit element connected in series with the first energy dissipation circuit element, wherein the first isolator circuit element is tuned to have an anti-resonant frequency of $w_1$; and
   a second shunt circuit connected across the electrical leads of the piezoelectric material in parallel with the first shunt circuit, the second shunt circuit having a natural frequency of $w_1$ such that the second shunt circuit damps vibrations having a natural frequency of $w_1$, the second shunt circuit including
      a second energy dissipation circuit element comprising
         a second dissipation element resistor, and
         a second frequency tuning element inductor connected in parallel with the second dissipation element resistor, and
      a second isolator circuit element connected in series with the second energy dissipation circuit element, wherein the second isolator circuit element is tuned to have an anti-resonant frequency of $w_2$.

2. The control device of claim 1, further including a structural element to which the piezoelectric material is fixed.

3. The control device of claim 1, wherein the first isolator element comprises a first isolator element capacitor and a first isolator element inductor connected in parallel with said first isolator element capacitor.

4. The control device of claim 1, wherein the second isolator element comprises a second isolator element capacitor and a second isolator element inductor connected in parallel with said second isolator element capacitor.

5. A mechanical vibration control device, comprising:
   a piezoelectric material having a pair of electrical leads extending therefrom; and
   a first shunt circuit connected across the electrical leads of the piezoelectric material, the first shunt circuit having a natural frequency of $w_2$, the first shunt circuit including
      a first energy dissipation circuit element comprising
         a first dissipation element resistor, and
         a first frequency tuning element inductor connected in parallel with the first dissipation element resistor, and
      a first isolator circuit element connected in series with the first energy dissipation circuit element, the first isolator circuit element tuned to have an anti-resonant frequency of $w_1$, the first isolator circuit element comprising
         a first isolator element capacitor, and
         a first isolator element inductor connected in parallel with the first isolation element capacitor and
   a second shunt circuit connected across the electrical leads of the piezoelectric material in parallel with the first shunt circuit, the second shunt circuit having a natural frequency of $w_1$ which is less than $w_2$, the second shunt circuit including
      a second energy dissipation circuit element comprising
         a second dissipation element resistor, and
         a second frequency tuning element inductor connected in parallel with the second dissipation element resistor,
   and wherein said second shunt circuit is independent of an isolator circuit element such that only said first circuit element includes an isolator circuit element.

6. The control device of claim 5, further including a structural element to which the piezoelectric material is fixed.

7. The control device of claim 5, wherein a first inductance of the first frequency tuning element inductor is different from a second inductance of the second frequency tuning element inductor.

8. A mechanical vibration control device, comprising:

a structural element having a mode of vibration with a natural frequency of $w_1$;

a piezoelectric material having a pair of electrical leads extending therefrom said piezoelectric material mounted to said structural element so as to damp the vibration of said structural element; and at least one shunt circuit connected across the electrical leads of the piezoelectric material, each shunt circuit including an energy dissipation circuit element comprising
a dissipation element resistor, and
a frequency tuning element inductor connected in parallel with the dissipation element resistor, and an isolator circuit element connected in series with the energy dissipation circuit element, the isolator circuit element comprising
an isolator element capacitor, and
an isolator element inductor connected in parallel with the isolation element capacitor, wherein at least one shunt circuit has a natural frequency of $w_1$ so as to reduce and damp the mode of vibration of said structural member with a frequency of $w_1$.

9. The control device of claim 8, wherein the at least one shunt circuit comprises at least two shunt circuits, and wherein each shunt circuit is tuned to reduce and damp a preselected vibrational mode of a preselected frequency.

10. The control device of claim 8, wherein the control device further includes a second shunt circuit connected across the electrical leads of the piezoelectric material in parallel with the first shunt circuit, the second shunt circuit including a second energy dissipation circuit element comprising
a second dissipation element resistor, and
a second frequency tuning element inductor connected in parallel with the dissipation element resistor.

11. The control device of claim 10, further including means for isolating the first energy dissipation circuit element from the second energy dissipation circuit element to avoid frequency tuning interference therebetween.

12. The control device of claim 10, wherein the second shunt circuit further includes a second isolator circuit element connected in series with the second energy dissipation circuit element, the second isolator circuit element comprising a second isolator element capacitor, and a second isolator element inductor connected in parallel with the second isolator element capacitor.

* * * * *

UNITED STATES PATENT AND TRADEMARK OFFICE
CERTIFICATE OF CORRECTION

PATENT NO. : 5,783,898

DATED : July 21, 1998

INVENTOR(S) : Wu

Page 1 of 2

It is certified that error appears in the above-identified patent and that said Letters Patent is hereby corrected as shown below:

Title page, [56] References Cited, U.S. PATENT DOCUMENTS, insert the following:

--2,443,471   6/1948    Mason
  2,814,021  11/1957    Oswald
  2,923,900   2/1960    Poschenrieder
  3,109,153  10/1963    Rodek
  3,222,622  12/1965    Curran et al.
  3,349,629  10/1967    Elazar
  3,409,787  11/1968    Agalides et al.
  3,437,848   4/1969    Borner et al.
  3,532,911  10/1970    Roberts et al.
  3,676,806   7/1972    Orchard et al.
  4,104,920   8/1978    Albert et al.
  4,156,823   5/1979    Suzuki
  4,158,787   6/1979    Forward
  4,181,864   1/1980    Etzold
  4,883,248  11/1989    Uchino et al.--.

Title page, [56] References Cited, insert:

--OTHER DOCUMENTS

N.W. Hagood et al., "Damping of Structural Vibrations with Piezoelectric Materials Passive Electrical Networks", J. Sound and Vibration, 146(2), pp. 243-268 (1991).--.

UNITED STATES PATENT AND TRADEMARK OFFICE
CERTIFICATE OF CORRECTION

PATENT NO. : 5,783,898

DATED : July 21, 1998

INVENTOR(S) : Wu

It is certified that error appears in the above-identified patent and that said Letters Patent is hereby corrected as shown below:

Column 8, line 48, after "capacitor" insert a semicolon (;).

Column 9, line 7, after "therefrom" insert a comma (,).

Signed and Sealed this

Fourth Day of January, 2000

*Attest:*

*Attesting Officer*   *Acting Commissioner of Patents and Trademarks*